(12) United States Patent
Beaver

(10) Patent No.: US 11,494,350 B2
(45) Date of Patent: Nov. 8, 2022

(54) BUILDING OF KNOWLEDGE BASE AND FAQ FROM VOICE, CHAT, EMAIL, AND SOCIAL INTERACTIONS

(71) Applicant: Verint Americas Inc., Alpharetta, GA (US)

(72) Inventor: Ian Beaver, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 337 days.

(21) Appl. No.: 16/543,761

(22) Filed: Aug. 19, 2019

(65) Prior Publication Data
US 2020/0110732 A1 Apr. 9, 2020

Related U.S. Application Data

(60) Provisional application No. 62/741,607, filed on Oct. 5, 2018.

(51) Int. Cl.
*G06F 16/215* (2019.01)
*G06F 16/2458* (2019.01)

(52) U.S. Cl.
CPC ........ *G06F 16/215* (2019.01); *G06F 16/2465* (2019.01)

(58) Field of Classification Search
CPC ............................ G06F 16/215; G06F 16/2465
See application file for complete search history.

(56) References Cited

U.S. PATENT DOCUMENTS

| | | | | |
|---|---|---|---|---|
| 6,618,725 B1 * | 9/2003 | Fukuda | ................. | G06F 16/345 |
| 2004/0122656 A1 * | 6/2004 | Abir | ....................... | G06N 5/022 |
| | | | | 704/4 |
| 2007/0203693 A1 * | 8/2007 | Estes | ........................ | G06N 3/08 |
| | | | | 704/9 |
| 2013/0024457 A1 | 1/2013 | Chua et al. | | |
| 2014/0040181 A1 * | 2/2014 | Kuznetsov | .............. | G06F 40/30 |
| | | | | 706/55 |
| 2019/0236205 A1 * | 8/2019 | Jia | ........................... | G06N 5/02 |

OTHER PUBLICATIONS

Deerwester, S., et al., "Improving Information Retrieval with Latent Semantic Indexing," Proceedings of the 51st ASIS Annual Meeting, vol. 25, 1988, 5 pages.
Hoffman, M., et al., "Online Learning for Latent Dirichlet Allocation," Advances in Neural Information Processing Systems 23 (NIPS 2010), 2010, pp. 856-864.
Rose, S., et al., "Automatic keyword extraction from individual documents," Text Mining: Applications and Theory, 2010, 20 pages.
Search Report, dated Nov. 15, 2019, received in connection with corresponding EP Patent Application No. 19201332.4.

* cited by examiner

*Primary Examiner* — James Trujillo
*Assistant Examiner* — J Mitchell Curran
(74) *Attorney, Agent, or Firm* — Meunier Carlin & Curfman LLC

(57) ABSTRACT

Systems and methods are provided to combine data from various internal data sources and external data sources to generate and maintain frequently asked questions and knowledge bases. By doing so, the collective knowledge of a company and customers' questions around it are aggregated and served in a way that increases the availability and relevancy of such knowledge for both self-help channels and computing agents (e.g., customer service representatives (CSRs)).

19 Claims, 6 Drawing Sheets

BUILDING OF KNOWLEDGE BASE AND FAQ FROM VOICE, CHAT, EMAIL, AND SOCIAL INTERACTIONS

CROSS-REFERENCE TO RELATED APPLICATIONS

This application claims the benefit of priority to U.S. Provisional Patent Application No. 62/741,607, filed on Oct. 5, 2018, entitled "Building of Knowledge Base and FAQ from Voice, Chat, Email and Social Interactions," the contents of which are hereby incorporated by reference in its entirety.

BACKGROUND

Modern companies use multiple channels to engage with their customers, handle support requests, as well as to gather feedback and monitor brand perception. Within these channels, company specific content is generated as customers ask questions and receive answers from employees and representatives over phone calls, e-mails, chat, and social platforms such as Twitter and Facebook. In many cases, this knowledge is prolific, such as questions about return policies or operating hours. In other instances however, a smaller subset of customers may have very specific questions regarding policy or scenarios that customer service representatives address. In addition, on forums and blogs customers may answer questions about company products and services for other customers. For example, on a forum relating to airline travel, such as on TripAdvisor.com, a user may post a question about the luggage allowances for a particular airline. Other users may then answer that question based on personal experience traveling with that airline.

While companies may have a frequently asked questions (FAQ) document that may be provided (or accessed) as (or via) a page on their website, these documents are commonly populated by taking a survey of a particular channel, such as common web search queries. In addition, once the FAQ document exists, it does not receive frequent updates unless there is a financial incentive to do so, like a disruption of service that causes a massive increase in contacts around a single knowledge item.

Customer service representatives (CSRs) rely upon knowledge bases (KBs) to find information to help customers. When they cannot find information specific to customer requests, they may ask supervisors, fellow CSRs, or transfer the customer to a different department. Therefore, if information about company products or policies is missing or incomplete within the KB, it can lead to resolution delays as well as poor customer experience, which can lead to lost revenue.

SUMMARY

Systems and methods are provided to combine data from various internal data sources and external data sources to generate and maintain frequently asked questions and knowledge bases. By doing so, the collective knowledge of a company and customers' questions around it are aggregated and served in a way that increases the availability and relevancy of such knowledge for both self-help channels and computing agents (e.g., customer service representatives (CSRs)).

In an implementation, a system comprises a data gathering module configured to gather data from one or more internal data sources and one or more external data sources; a de-duplication module configured to de-duplicate the data; and a compiler configured to compile the de-duplicated data, generate frequently asked questions (FAQ) for a FAQ document, and generate knowledge base (KB) articles for a KB library.

In an implementation, a method comprises obtaining data from at least one of one or more internal data sources and one or more external data sources; de-duplicating the data; compiling the de-duplicated data into at least one of questions, requests, answers, or resolutions; generating frequently asked questions (FAQ) for a FAQ document using the de-duplicated data; and generating knowledge base (KB) articles for a KB library using the de-duplicated data.

In an implementation, a system comprises an agent computing device configured to receive a call from a user computing device; and a computing device comprising: a data gathering module configured to gather data from one or more internal data sources and one or more external data sources; a de-duplication module configured to de-duplicate the data; and a compiler configured to compile the de-duplicated data, generate frequently asked questions (FAQ), and generate knowledge base (KB) articles.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
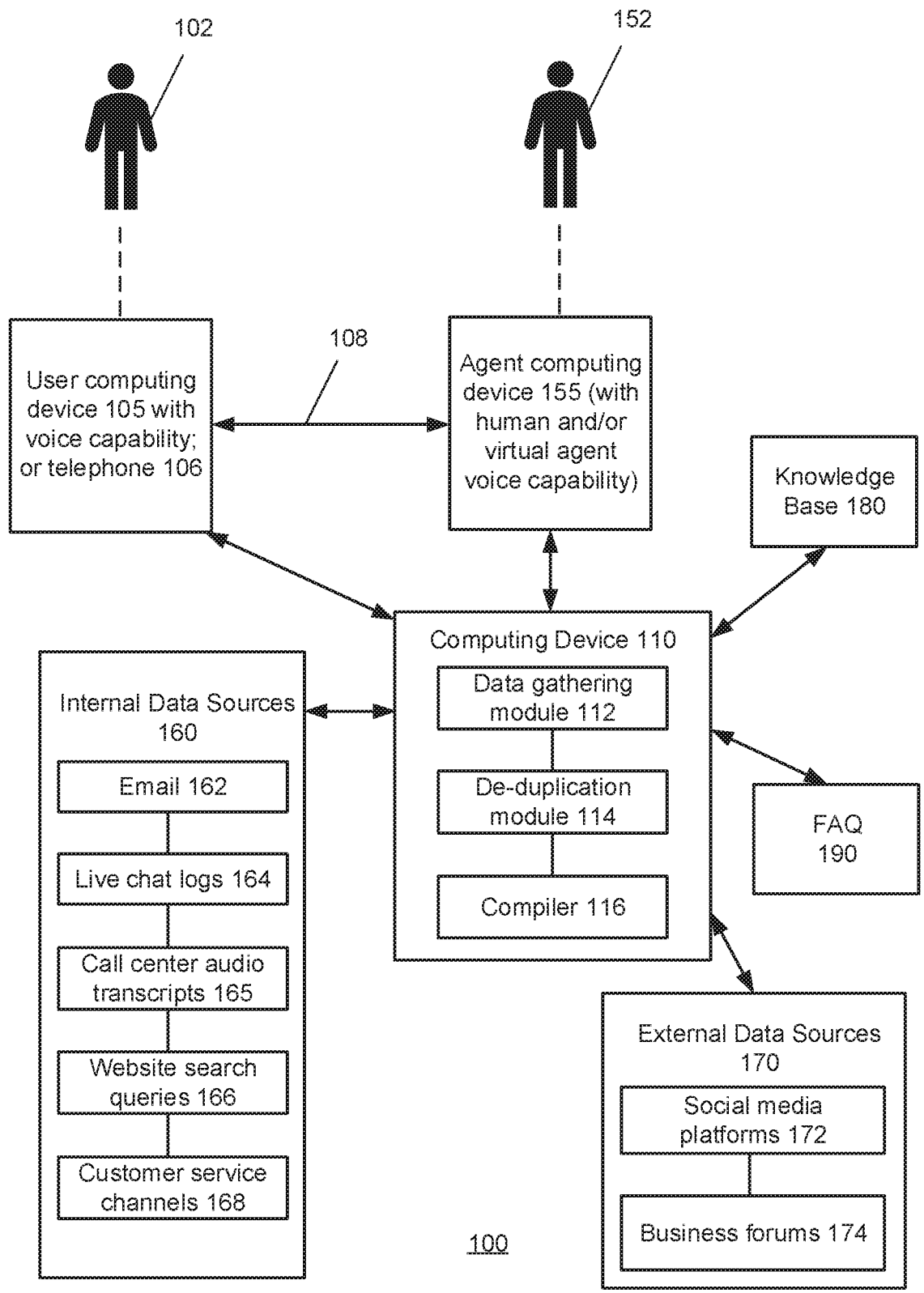
FIG. 1 is an illustration of an exemplary environment for building a knowledge base and frequently asked questions (FAQ) document.

FIG. 1 is an illustration of an exemplary environment 100 for building FAQ documents (also referred to as FAQ or FAQs) and knowledge bases (KBs). A user 102, using a user computing device 105 with voice capability or using a telephone 106, contacts an entity through a network 108. More particularly, the user 102 contacts an agent 152 (or representative, employee, associate, etc.) of a company using the user computing device 105 or the telephone 106 in communication with an agent computing device 155 via the network 108. The agent computing device 155 has human voice capability. Additionally or alternatively, the agent computing device 155 has virtual agent voice capability.

A computing device 110 may be in communication with the agent computing device 155 and/or the user computing device 105 or the telephone 106 to monitor the speech in a voice call (i.e., the conversation) between the user computing device 105 (or the telephone 106) and the agent computing device 155. The computing device 110 may be implemented in, or embodied in, a desktop analytics product or in a speech analytics product, in some implementations. The computing device 110 may include a data gathering module 112, a de-duplication module 114, and a compiler 116. In some implementations, the computing device 110 may be comprised within the agent computing device 155. In some implementations, one or more of the data gathering module 112, a de-duplication module 114, or the compiler 116 may be comprised within the agent computing device 155 or another computing device (not shown).

The network 108 may be a variety of network types including the public switched telephone network (PSTN), a cellular telephone network, and a packet switched network (e.g., the Internet). Although only one user computing device 105/telephone 106, one agent computing device 155, and one computing device 110 are shown in FIG. 1, there is no limit to the number of computing devices 105, 155, 110 and telephones 106 that may be supported.

Figure 6:
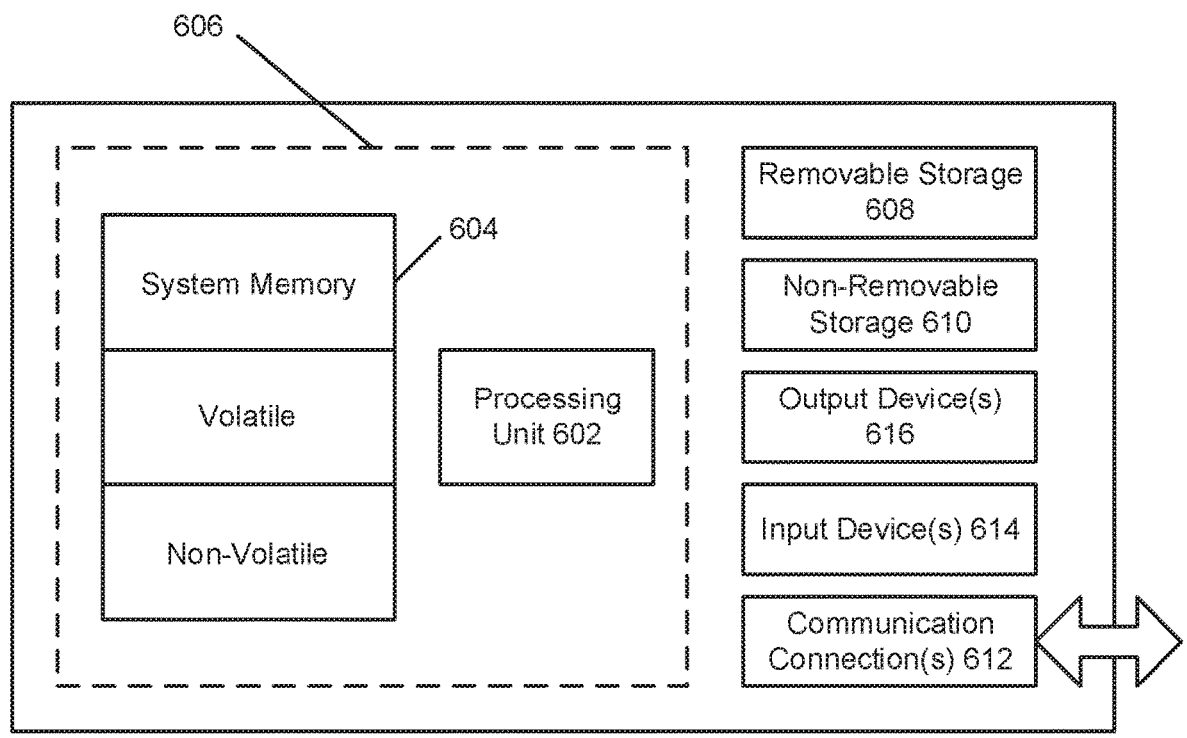
FIG. 6 shows an exemplary computing environment in which example embodiments and aspects may be implemented.

The user computing device 105, the agent computing device 155, and the computing device 110, may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 6 as the computing device 600.

In some implementations, the computing device 110 is in communication with, and is configured to receive data from, one or more internal data sources 160 and/or or ore more external data sources 170. The computing device 110 is also configured to generate and/or access a knowledge base (KB) library referred to as a knowledge base 180 and a FAQ document referred to as a FAQ 190.

The data gathering module 112 is configured to gather, obtain, or otherwise receive data from the internal data sources 160 and the external data sources 170. The internal data sources 160 may comprise one or more of email 162, live chat logs, call center audio transcripts 165, website search queries 166, and customer service channels 168, for example. The external data sources 170 may comprise social medial platforms 172 and/or business forums 174, for example.

As described further herein, the computing device 110 uses the internal data sources 160 and/or the external data sources 170 to generate data for the knowledge base 180 and the FAQ 190. Data from the knowledge base 180 and/or the FAQ 190 can be accessed by the computing device 110 and provided to the user 102 (e.g., via the user computing device 105, the telephone 106, the agent 152, and/or the agent computing device 155, depending on the implementation). Alternatively or additionally, the agent 152 may access and receive data from the knowledge base 180 and/or the FAQ 190 via the agent computing device 155 and the computing device 110. This helps to assist the agent 152 in providing better service and information to the user 102.

Systems and methods are provided to combine the data from the various internal data sources 160 and the data from the external data sources 170 to generate and maintain FAQs (e.g., the FAQ 190) and KBs (e.g., the KB 180) using a holistic view of customer requests. By doing so, the collective knowledge of a company and customers' questions around it will be aggregated and served in a way that increases the availability and relevancy of such knowledge for both self-help channels and computing agents (e.g., customer service representatives (CSRs)).

In an implementation, in order to generate the content for the knowledge base 180 and the FAQ 190, a computing device, such as the computing device 110, obtains data from one or more sources, categorizes the data, determines a resolution, resolves duplications (e.g., using the de-duplication module 114), compiles the data into a consumable form (e.g., using the compiler 116), and submits the compiled data for review (e.g., to a human checker or automated checker).

Figure 2:
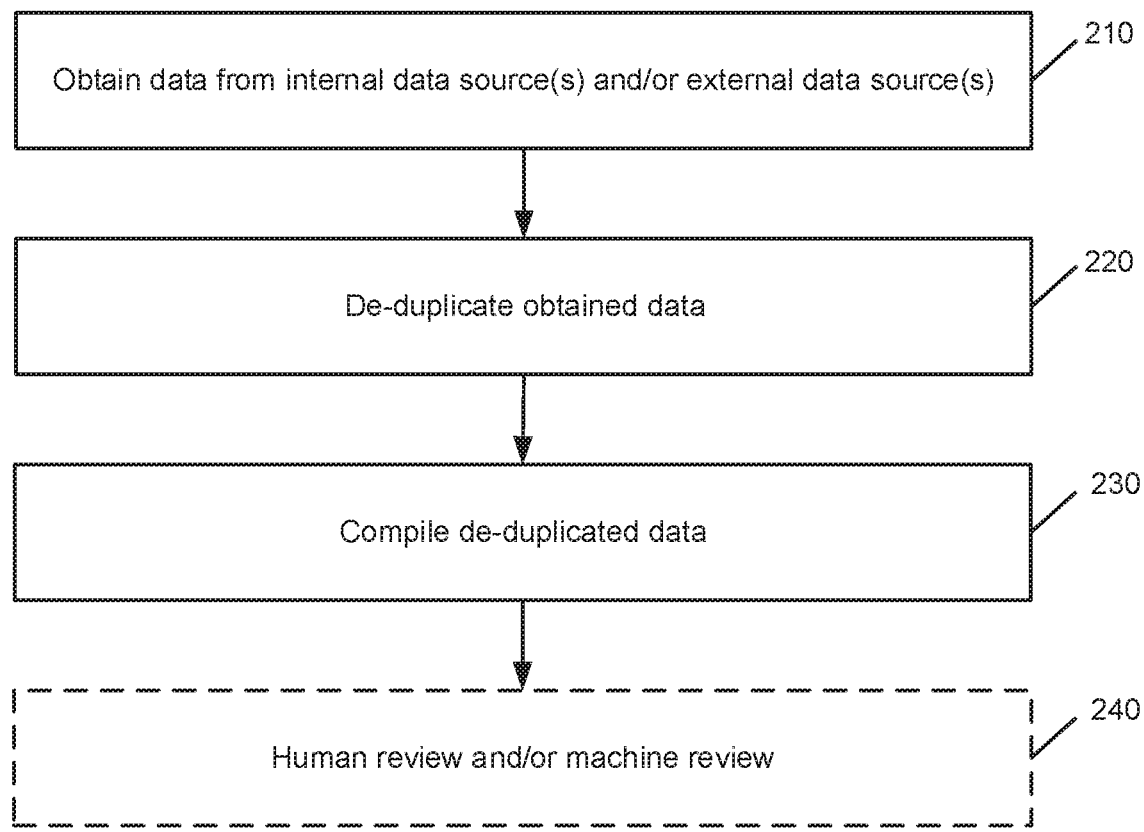
FIG. 2 is an operational flow of an implementation of a method for building a knowledge base and FAQ.

FIG. 2 is an operational flow of an implementation of a method 200 for building a knowledge base and FAQ, such as the knowledge base 180 and the FAQ 190. The method 200 may be implemented using one or more aspects of the environment 100, for example.

At 210, data is obtained from one or more internal data sources 160 and/or one or more external data sources 170. For example, the data gathering module 112 may request and receive, or otherwise obtain, data from the one or more internal data sources 160 and/or the one or more external data sources 170. In some implementations, the data (which is subsequently used for content in the knowledge base 180 and the FAQ 190) may come from multiple internal and/or external data sources to provide a holistic view of the customer or user needs regarding a company or other entity that the customer or user does business with or otherwise interacts with.

De-duplication of the obtained data is performed at 220, e.g., using the de-duplication module 114. In this manner, duplicates of data in the obtained data are identified and removed from the obtained data. Any technique of de-duplication of data may be used. Regarding de-duplication, in an implementation, topic groups may be constructed, and the system may perform de-duplication to reduce the volume of data in the topic groups and use these topic groups in establishing data priorities such as FAQ priorities.

At 230, the de-duplicated data is compiled, e.g., using the compiler 116, and stored in the knowledge base 180 and/or the FAQ 190 as appropriate (e.g., associated with a topic or a discussion in the knowledge base 180, stored as a resolution to a question in the FAQ 190, etc.)

Regarding data compilation, in an implementation, after the de-duplication process is complete, the questions or data may be prioritized, optionally by topic. The prioritization is based on the volume of similar questions or data across all input channels to the system. For example, the more popular a question is, the higher its priority to be inserted into a knowledge base or FAQ. The posting dates can also be used to influence priority. More active questions or topics that are also more recent may be higher than historically active topics.

At 240, optionally, the data that has been stored in the knowledge base 180 and the FAQ 190 may be reviewed by a checker, such as a human or a computing device to ensure that the data has been stored appropriately (e.g., appropriate categories, associated with appropriate questions or other data, etc.)

Regarding human review, at this point in an implementation, the system contains a prioritized list of questions and resolutions to add to an FAQ page, and a prioritized list of KB articles to add to the company KB library. In addition, the system may generate recommended topics to be included in customer service representative training based on their frequency and prevalence across all channels. The system may also calculate coverage of the new content within existing sources such as an IVA language model and KB library, and prioritize new content based on holes in existing sources. In an implementation, humans review the new content and consult the reference and alternative forms to generated approved forms of content, and post this content into the KB library and FAQ databases. In this way, any improper resolutions or poor wording can be fixed before inclusion in company knowledge sources.

Figure 3:
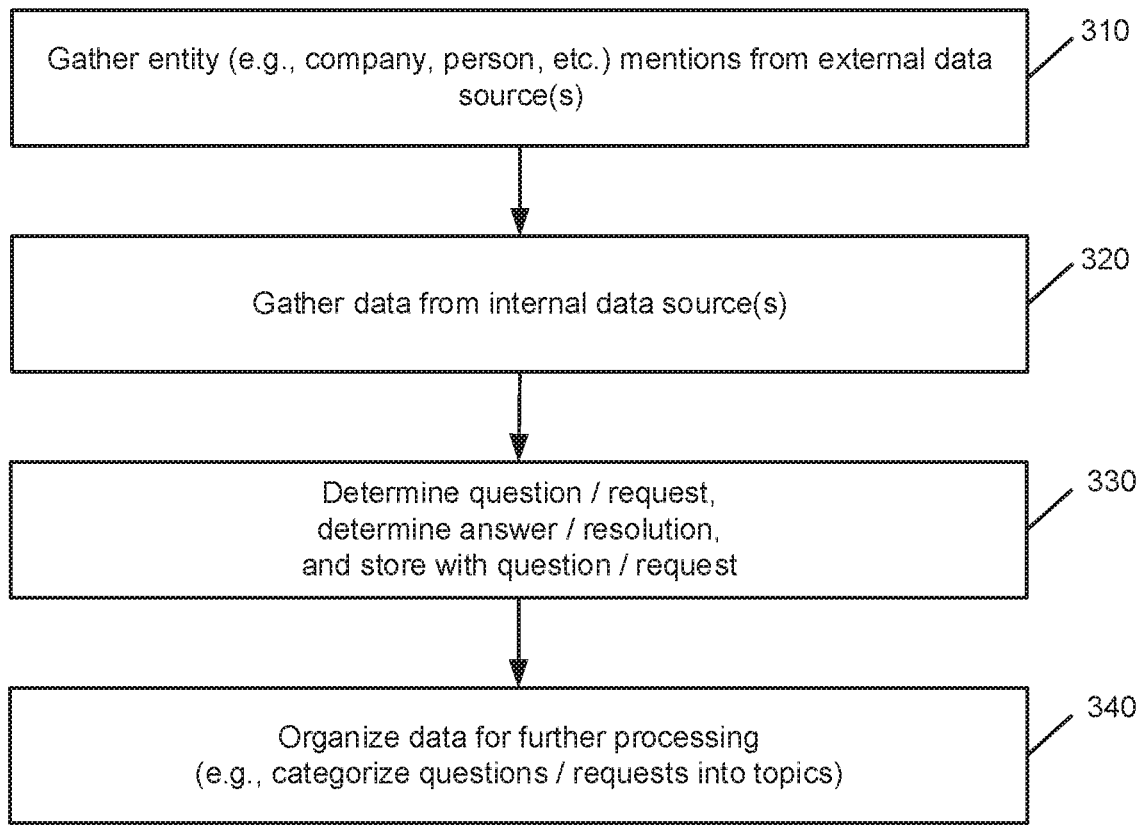
FIG. 3 is an operational flow of an implementation of a method of obtaining data for building a knowledge base and FAQ.

FIG. 3 is an operational flow of an implementation of a method 300 of obtaining data for building a knowledge base and FAQ. The method 300 may, for example, be incorporated into the operation 210 described above with respect to FIG. 2.

At 310, the data gathering module 112 gathers the entity (e.g., company, person, etc.) mentions from the external data source(s) 170. In an implementation, the data gathering module 112 periodically gathers all the mentions of a particular entity in various social media platforms (e.g., Twitter, Facebook, etc.), and monitors popular forums related to the entity (e.g., company business lines) such as TripAdvisor, Quora, or Google groups and gathers data from these forums.

The data from the external data source(s) 170 will be combined with data from internal data sources such as e-mail, live chat logs, call center audio transcriptions, website search queries, and similar customer service channels. Thus, at 320, data is gathered from the internal data source(s) 160.

At 330, for each data item that was obtained from the data sources, the question or request associated with the data item (e.g., that prompted, formed, or is related to the data item, etc.) is determined, along with the answer or resolution to the question or request. The question, request, answer, and/or resolution may be found in, or determined from, the data item, depending on the implementation and/or the data item itself. The data gathering module 112 may perform the question, request, answer, and/or resolution determination in some implementations. In other implementations, the compiler 116 may perform the question, request, answer, and/or resolution determination. The answer or resolution may be stored in storage with the question or request. The storage may be storage associated with the computing device 110.

For each user or customer service interaction, whether it was through a channel of the entity such as e-mail or an external channel like a social media platform, the answer or resolution is determined and stored with the question or request that resulted in the answer or resolution. For example, on Twitter, if a user named Bob posts a question such as "How do I transport my skiing equipment @XYZ-Airlines", a representative of XYZ airlines, or even another traveler on XYZ Airlines may respond "@Bob you can take one ski bag and one boot bag as checked luggage". To this response, Bob may reply "good to know, thanks @XYZ-Airlines". These external sources of knowledge are valuable to understand common questions users or customers have about a product or service, as they can give valuable insight into what users and customers talk about in public versus contacting the entity (e.g., the company) directly for.

For each request or question found, the data gathering module 112 (or the compiler 116, depending on the implementation) gathers the answer or resolution. A conversation graph may be generated from timestamps and mentions, thereby making it straightforward to determine whether the resolution was reached and at what point. One technique would be to look for signs of gratitude on the part of the original poster and use the previous post directed to that user as the point of resolution and the resolution content. A similar technique can be applied to all sources of knowledge such as live chat or e-mail. If no resolution was reached or is detectable, the original question can still be used to determine frequency for populating FAQ entries.

At 340, the data may be organized for further processing, e.g., by the data gathering module 112 or the compiler 116, depending on the implementation. Therefore, once the set of customer questions and their resolutions are gathered, the data is organized for further processing. For example, the questions and requests may be categorized into topics. One step of organization is to categorize the questions into topics using common topic modeling approaches such as Latent Semantic Indexing or Latent Dirichlet Allocation. In this manner, the questions can be grouped into their most similar topic(s).

Figure 4:
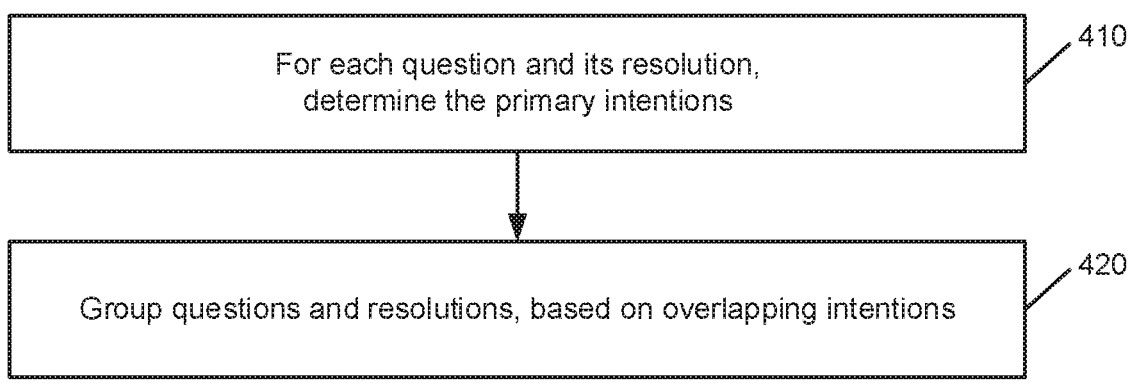
FIG. 4 is an operational flow of an implementation of a method of de-duplication for building a knowledge base and FAQ.

FIG. 4 is an operational flow of an implementation of a method 400 of data de-duplication for building a knowledge base and FAQ. The method 400 may, for example, be incorporated into the operation 220 described above with respect to FIG. 2, and performed by the de-duplication module 114.

At 410, for each question (or request) and its resolution (or answer), the primary intentions may be determined. Each question and its associated resolution, if one exists, may be analyzed to determine the primary user intentions. This can be accomplished several ways. For example, if the company has an existing Intelligent Virtual Assistant (IVA), the content can be fed to the IVA to determine a list of possible intentions present. Alternatively, if the company has an existing KB, a similarity score can be calculated between the content and the existing KB articles. If a similar article is found and the similarity score is greater than a predetermined threshold, it can be used to label the new content. If the company has neither an IVA nor an existing KB, key words and phrases can be extracted using known methods.

At 420, the questions and resolutions may be grouped based on similar or overlapping intentions. Once the primary intentions have been identified in each question and resolution, they can be grouped by overlapping intentions and counted. A resolution may have multiple questions associated with it, as there can be many ways to ask about the same topic. Similar questions may have different resolutions as well, depending on the channel they originated from. For example, if a user or customer asks about traveling with skis on one channel, such as Twitter, they may get a first response, such as a very short and direct response. If the same question was posed on a forum or over e-mail, the user or customer may get a detailed response that included the full baggage policy. Both are an acceptable resolution to the question.

Figure 5:
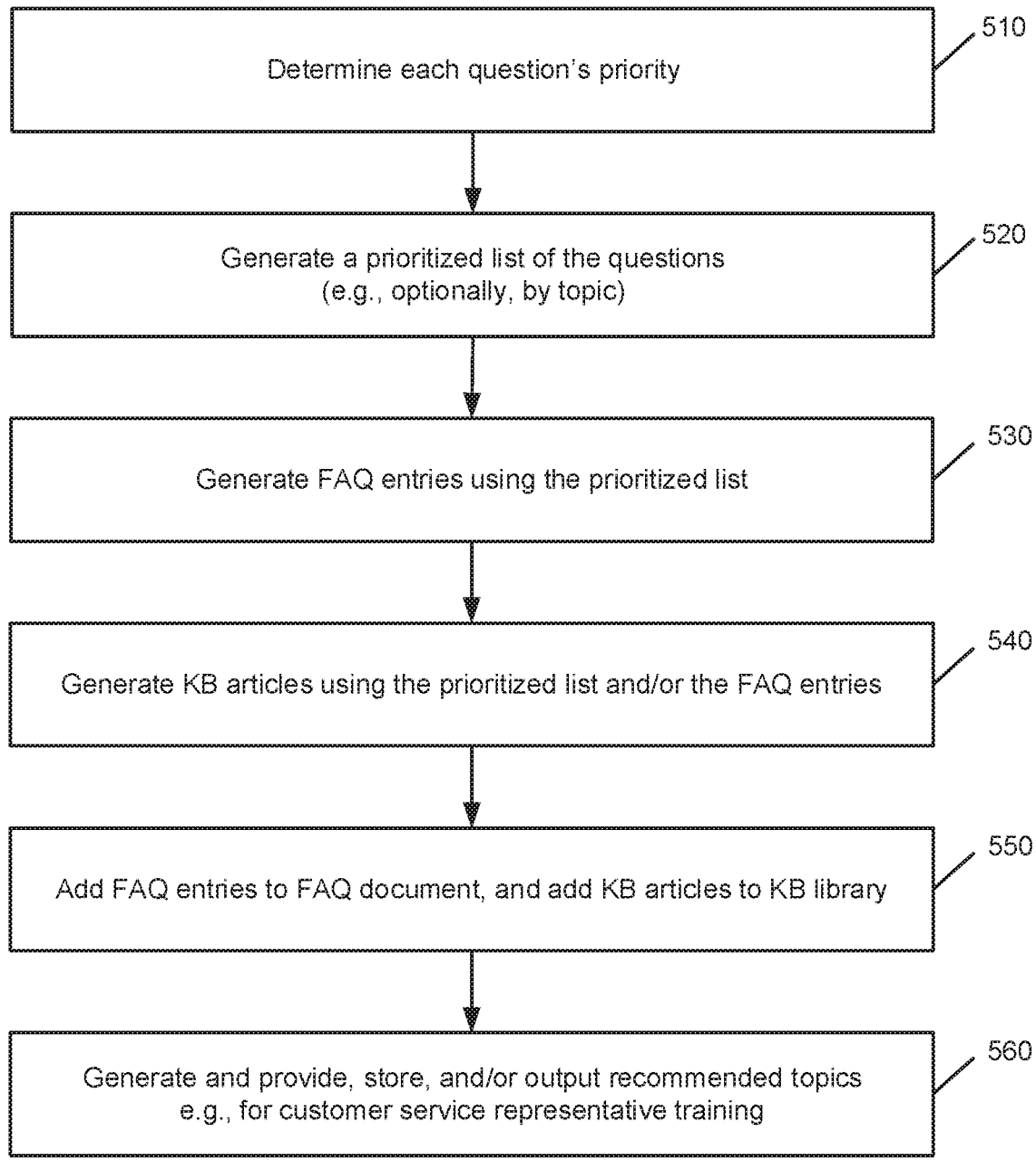
FIG. 5 is an operational flow of an implementation of a method of compilation for building a knowledge base and FAQ.

FIG. 5 is an operational flow of an implementation of a method 500 of compilation for building a knowledge base and FAQ. The method 500 may, for example, be incorporated into the operation 230 described above with respect to FIG. 2, and performed by the compiler 116.

At 510, each question's priority is determined. As noted above with respect to operation 23o, the questions may be prioritized by topic in an implementation. The prioritization may be based on the volume of similar questions across all input channels to the system. Thus, the more popular a question is, the higher its priority to be inserted into a knowledge base or FAQ. The posting dates can also be used to influence priority. More active questions or topics that are also more recent may be higher than historically active topics.

At 520, a prioritized list of the questions is generated. In an implementation, the list may comprise sets of the questions arranged by topic.

At 530, FAQ entries are generated using the prioritized list. At 540, knowledge base articles are generated using the prioritized list and/or the FAQ entries. In an implementation, using the prioritized list, FAQ entries can be generated by choosing representative question and resolution pairs from each group addressing the same user intentions. The rest of the questions and resolutions with the same intentions can be used as reference for alternative wording or content. In addition, similar questions that have different resolutions (such as in baggage policy scope in the earlier example) can be grouped together to form KB articles. The article may comprise related resolution(s) and the type(s) of questions that can drive to it.

At 550, the FAQ entries are added to the FAQ document, and the knowledge base articles are added to the knowledge base library.

At 560, recommended topics may be generated and provided, stored, or otherwise outputted. The recommended topics may be used for CSR (customer service representative) training, for example.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for building a knowledge base and/or FAQ is provided. The system includes a data gathering module configured to gather data from one or more internal data sources and one or more external data sources; a de-duplication module configured to de-duplicate the data; and a compiler configured to compile the de-duplicated data, generate frequently asked questions (FAQ) for a FAQ document, and generate knowledge base (KB) articles for a KB library.

Implementations may include some or all of the following features. The one or more internal data sources comprises at least one of email, live chat logs, call center audio transcripts, website search queries, or customer service channels. The one or more external data sources comprises at least one of social media platforms or business forums. The data gathering module, the de-duplication module, and the compiler are comprised within a computing device. The system further comprises the FAQ document and the KB library, wherein the FAQ document and the KB library are accessible by at least one of a user computing device or an agent computing device during a call between the user computing device and the agent computing device. The agent computing device has at least one of human voice capability or virtual agent voice capability. The compiler is further configured to add the FAQ to the FAQ document and to add the KB articles to the KB library. The compiler is further configured to prioritize data in the de-duplicated data. The de-duplication module is further configured to construct topic groups for the data, perform de-duplication to reduce the volume of data in the topic groups, and to use the topic groups in establishing data priorities.

In an implementation, a method for building a knowledge base and/or FAQ is provided. The method includes obtaining data from at least one of one or more internal data sources and one or more external data sources; de-duplicating the data; compiling the de-duplicated data into at least one of questions, requests, answers, or resolutions; generating frequently asked questions (FAQ) for a FAQ document using the de-duplicated data; and generating knowledge base (KB) articles for a KB library using the de-duplicated data.

Implementations may include some or all of the following features. The one or more internal data sources comprises at least one of email, live chat logs, call center audio transcripts, website search queries, or customer service channels, and the one or more external data sources comprises at least one of social media platforms or business forums. The method further comprises prioritizing data in the de-duplicated data, adding the FAQ to the FAQ document, and adding the KB articles to the KB library. The method further comprises constructing topic groups for the data, performing de-duplication to reduce the volume of data in the topic groups, and using the topic groups in establishing data priorities. The method further comprises determining primary user intentions for each of the questions, requests, answers, or resolutions. The method further comprises storing each question with an associated answer in the FAQ document, and storing each request with an associated resolution in the KB library.

In an implementation, a system for building a knowledge base and/or FAQ is provided. The system includes an agent computing device configured to receive a call from a user computing device; and a computing device comprising: a data gathering module configured to gather data from one or more internal data sources and one or more external data sources; a de-duplication module configured to de-duplicate the data; and a compiler configured to compile the de-duplicated data, generate frequently asked questions (FAQ), and generate knowledge base (KB) articles.

Implementations may include some or all of the following features. A FAQ document comprises the FAQ, and a KB library comprises the KB articles, wherein the compiler is further configured to add the FAQ to the FAQ document and to add the KB articles to the KB library using topics and priorities. The FAQ document and the KB library are accessible by at least one of a user computing device or the agent computing device during a call between the user computing device and the agent computing device. The one or more internal data sources comprises at least one of email, live chat logs, call center audio transcripts, website search queries, or customer service channels, and the one or more external data sources comprises at least one of social media platforms or business forums. The de-duplication module is further configured to construct topic groups for the data, perform de-duplication to reduce the volume of data in the topic groups, and to use the topic groups in establishing data priorities.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising: a data gathering module configured to gather data from one or more internal data sources and one or more external data sources;
   a de-duplication module configured to de-duplicate the data by constructing topic groups and de-duplicating the data in the topic groups, to reduce a volume of data in the topic groups;
   and a checker configured to receive a first prioritized list of frequently asked questions (FAQ) for an FAQ document;
   receive a second prioritized list of knowledge base (KB) articles for a KB library;
   prioritize the data in the de-duplicated data by the topic groups based on the first prioritized list and the second prioritized list;
   generate FAQ for the FAQ document, and generate KB articles for the KB library, using the prioritized data.

2. The system of claim 1, wherein the one or more internal data sources comprises at least one of email, live chat logs, call center audio transcripts, website search queries, or customer service channels.

3. The system of claim 1, wherein the one or more external data sources comprises at least one of social media platforms or business forums.

4. The system of claim 1, wherein the data gathering module, the de-duplication module, and the compiler are comprised within a computing device.

5. The system of claim 1, wherein the FAQ document and the KB library are accessible by at least one of a user computing device or an agent computing device during a call between the user computing device and the agent computing device.

6. The system of claim 5, wherein the agent computing device has at least one of human voice capability or virtual agent voice capability.

7. The system of claim 1, wherein the compiler is further configured to add the generated FAQ to the FAQ document and to add the generated KB articles to the KB library.

8. The system of claim 1, wherein the de-duplication module is further configured to use the topic groups in establishing data priorities.

9. A method comprising:
   obtaining data from at least one of one or more internal data sources and one or more external data sources;

de-duplicating the data by constructing topic groups and de-duplicating the data in the topic groups, to reduce a volume of data in the topic groups;

receiving a first prioritized list of frequently asked questions (FAQ) for an FAQ document;

receiving a second prioritized list of knowledge base (KB) articles for a KB library;

prioritizing the data in the de-duplicated data by the topic groups based on the first prioritized list and the second prioritized list;

generating FAQ for the FAQ document using the prioritized de-duplicated data; and generating KB articles for the KB library using the prioritized de-duplicated data.

10. The method of claim 9, wherein the one or more internal data sources comprises at least one of email, live chat logs, call center audio transcripts, website search queries, or customer service channels, and wherein the one or more external data sources comprises at least one of social media platforms or business forums.

11. The method of claim 9, further comprising adding the generated FAQ to the FAQ document, and adding the generated KB articles to the KB library.

12. The method of claim 9, further comprising using the topic groups in establishing data priorities.

13. The method of claim 9, wherein the deduplicated data comprises at least one of questions, requests, answers, or resolutions and further comprising determining primary user intentions for each of the questions, requests, answers, or resolutions.

14. The method of claim 9, further comprising storing each question with an associated answer in the FAQ document, and storing each request with an associated resolution in the KB library.

15. A system comprising: an agent computing device configured to receive a call from a user computing device; and a computing device comprising: a data gathering module configured to gather data from one or more internal data sources and one or more external data sources;

a de-duplication module configured to de-duplicate the data by constructing topic groups and de-duplicating the data in the topic groups, to reduce a volume of data in the topic groups;

and a checker configured to receive a first prioritized list of frequently asked questions (FAQ) for an FAQ document;

receive a second prioritized list of knowledge base (KB) articles for a KB library;

prioritize the data in the de-duplicated data by the topic groups based on the first prioritized list and the second prioritized list;

generate FAQ using the prioritized data, and generate KB articles using the prioritized data.

16. The system of claim 15, wherein the compiler is further configured to add the generated FAQ to the FAQ document and to add the generated KB articles to the KB library using topics and priorities.

17. The system of claim 16, wherein the FAQ document and the KB library are accessible by at least one of a user computing device or the agent computing device during a call between the user computing device and the agent computing device.

18. The system of claim 15, wherein the one or more internal data sources comprises at least one of email, live chat logs, call center audio transcripts, website search queries, or customer service channels, and wherein the one or more external data sources comprises at least one of social media platforms or business forums.

19. The system of claim 15, wherein the de-duplication module is further configured to use the topic groups in establishing data priorities.

* * * * *